(12) United States Patent
Maguire (10) Patent No.: US 8,081,063 B2
(45) Date of Patent: Dec. 20, 2011

(54) SYSTEMS AND METHODS FOR Q VALUE DETERMINATION (75) Inventor: Yael Maguire, Somerville, MA (US)

(73) Assignee: Trimble Navigation Limited, Sunnyvale, CA (US)

( * ) Notice: Subject to any disclaimer, the term of this patent is extended or adjusted under 35 U.S.C. 154(b) by 1250 days.

(21) Appl. No.: 11/559,227

(22) Filed: Nov. 13, 2006

(65) Prior Publication Data
US 2008/0111664 A1 May 15, 2008

(51) Int. Cl.
H04Q 5/22 (2006.01)
(52) U.S. Cl. .............. 340/10.2; 340/10.3; 340/10.5
(58) Field of Classification Search .......... 340/10.2, 340/571.1, 10.3, 10.5; 455/67.13; 235/436; 370/465
See application file for complete search history.

(56) References Cited

U.S. PATENT DOCUMENTS

| | | | |
|---|---|---|---|
| 4,210,910 A | 7/1980 | Wohlers | |
| 4,672,227 A | 6/1987 | Lagree et al. | |
| 4,747,061 A | 5/1988 | Lagree et al. | |
| 4,791,255 A | 12/1988 | Eliezer | |
| 4,894,796 A | 1/1990 | Engel et al. | |
| 4,924,210 A | 5/1990 | Matsui et al. | |
| 5,397,868 A | 3/1995 | Smith et al. | |
| 5,425,032 A | 6/1995 | Shloss et al. | |
| 5,537,398 A | 7/1996 | Siwiak | |
| 5,604,486 A | 2/1997 | Lauro et al. | |
| 5,638,295 A | 6/1997 | Lagree et al. | |
| 5,990,820 A | 11/1999 | Tan | |
| 6,084,530 A | 7/2000 | Pidwerbetsky et al. | |
| 6,122,329 A | 9/2000 | Zai et al. | |
| 6,172,609 B1 | 1/2001 | Lu et al. | |
| 6,204,750 B1 * | 3/2001 | Scheelen ............ 340/10.1 |
| 6,334,051 B1 | 12/2001 | Tsurumi et al. | |
| 6,492,933 B1 | 12/2002 | McEwan | |
| 6,509,828 B2 | 1/2003 | Bolavage et al. | |
| 6,529,488 B1 | 3/2003 | Urs et al. | |
| 6,563,417 B1 | 5/2003 | Shaw et al. | |
| 6,577,216 B2 | 6/2003 | Turner et al. | |
| 6,590,481 B2 | 7/2003 | Turner et al. | |
| 6,617,962 B1 | 9/2003 | Horwitz et al. | |
| 6,631,170 B1 | 10/2003 | Gu | |

(Continued)

FOREIGN PATENT DOCUMENTS
WO WO-99/34526 7/1999

(Continued)

OTHER PUBLICATIONS

EPC Radio Frequency Identity Protocols, Class-1 Generation-2 UHF RFID, Conformance Requirements, Version 1.0.2. Feb. 2005, 40 pages.

(Continued)

Primary Examiner — Vernal Brown
(74) Attorney, Agent, or Firm — Foley & Lardner LLP; John D. Lanza (57) ABSTRACT Systems and methods for determining a Q value for a subsequent inventory round can include a radio frequency identification (RFID) interrogator determining at least one of: a number of empty slots, a number of collided slots, and a number of singly occupied slots, in response to the completion of an inventory round, and applying a function to at least one of: the number of empty slots, the number collided slots, and the number of singly occupied slots, to determine the Q value.

25 Claims, 9 Drawing Sheets

U.S. PATENT DOCUMENTS

| | | | |
|---|---|---|---|
| 6,674,327 | B2 | 1/2004 | Harberts |
| 6,735,426 | B1 | 5/2004 | Pau |
| 6,801,109 | B2 | 10/2004 | Simms |
| 6,812,824 | B1 | 11/2004 | Goldinger et al. |
| 6,812,841 | B2 * | 11/2004 | Heinrich et al. ........... 340/572.1 |
| 6,849,967 | B2 | 2/2005 | Lathrop et al. |
| 6,861,930 | B2 | 3/2005 | Simms et al. |
| 6,995,327 | B1 | 2/2006 | Shepstone et al. |
| 7,002,505 | B2 | 2/2006 | Hughes |
| 7,075,412 | B1 | 7/2006 | Reynolds et al. |
| 7,119,736 | B2 | 10/2006 | Heide et al. |
| 7,193,504 | B2 | 3/2007 | Carrender et al. |
| 7,215,976 | B2 | 5/2007 | Brideglall |
| 7,227,449 | B2 | 6/2007 | Bonneau, Jr. et al. |
| 7,327,775 | B1 | 2/2008 | Gu |
| 7,383,025 | B2 | 6/2008 | Xuan et al. |
| 7,391,329 | B2 | 6/2008 | Humes et al. |
| 7,411,506 | B2 * | 8/2008 | Volpi et al. ................. 340/572.4 |
| 2002/0079741 | A1 | 6/2002 | Anderson |
| 2002/0154653 | A1 | 10/2002 | Benveniste |
| 2003/0104848 | A1 | 6/2003 | Brideglall |
| 2003/0214389 | A1 | 11/2003 | Arneson et al. |
| 2004/0022204 | A1 | 2/2004 | Trembley |
| 2004/0190092 | A1 | 9/2004 | Silverbrook et al. |
| 2004/0196177 | A1 | 10/2004 | Billington et al. |
| 2004/0199297 | A1 | 10/2004 | Schaper et al. |
| 2004/0222878 | A1 | 11/2004 | Juels |
| 2005/0035849 | A1 | 2/2005 | Yizhack |
| 2005/0280505 | A1 * | 12/2005 | Humes et al. ................. 340/10.1 |
| 2005/0286660 | A1 | 12/2005 | Nysen et al. |
| 2006/0022815 | A1 | 2/2006 | Fischer et al. |
| 2006/0023813 | A1 | 2/2006 | Jaffe et al. |
| 2006/0028069 | A1 | 2/2006 | Loucks et al. |
| 2006/0129798 | A1 | 6/2006 | Bance et al. |
| 2006/0186995 | A1 | 8/2006 | Wu et al. |
| 2008/0150699 | A1 | 6/2008 | Ohara et al. |

FOREIGN PATENT DOCUMENTS

| | | |
|---|---|---|
| WO | WO-2006/093984 A | 9/2006 |

OTHER PUBLICATIONS

International Search Report, PCT/US2006/023180, mailed on May 15, 2007.
Written Opinion of the International Searching Authority, PCT/US2006/023180, mailed on May 15, 2007.
International Preliminary Report on Patentability, PCT/US2006/023180, mailed on Jan. 17, 2008.
International Search Report from PCT/US2007/084487, mailed Sep. 3, 2008.
Written Opinion of the International Searching Authority from PCT/US2007/084487 mailed Sep. 3, 2008.
Office Action dated Feb. 5, 2009.
Office Action dated Aug. 20, 2008.
Office Action dated Mar. 19, 2008.
International Search Report, PCT/US2008/051861, mailed on Dec. 23, 2008.
Juels, A. "RFID Security and Privacy: A Research Survey" XP002375728 Retrieved from the Internet Sep. 28, 2005.
Kwak, J. et al., "RFID System with Fairness Within the Framework of Security and Privacy" XP019026267, vol. 3813, Jan. 1, 2005.
Office Action dated Aug. 17, 2009.
Office Action dated Jul. 23, 2009.
Restriction Requirement dated Jun. 8, 2009.
Written Opinion of the International Searching Authority, PCT/US08/51861, mailed on Dec. 23, 2008.
Advisory Action dated Jan. 15, 2010.
Notice of Allowance dated Apr. 5, 2010.
Notice of Allowance for U.S. Appl. No. 11/559,248 dated May 26, 2011.
Notice of Allowance for U.S. Appl. No. 11/459,634 dated Nov. 4, 2009.
Notice of Allowance for U.S. Appl. No. 11/422,075 dated Dec. 15, 2009.

* cited by examiner

| SLOT 0 | SLOT 1 | SLOT 2 | SLOT 3 | SLOT 4 | SLOT 5 | SLOT 6 | SLOT 7 |
|---|---|---|---|---|---|---|---|
| TAG 1 | | TAG 2<br>TAG 3 | TAG 4 | TAG 5<br>TAG 6 | TAG 7<br>TAG 8<br>TAG 9 | TAG 11<br>TAG 12<br>TAG 10 | TAG 13<br>TAG 14 |
| 100A | 100B | 100C | 100D | 100E | 100F | 100G | 100H |

*Fig. 1A*

| SLOT 0 | SLOT 1 | SLOT 2 | SLOT 3 | SLOT 4 | SLOT 5 | SLOT 6 | SLOT 7 |
|---|---|---|---|---|---|---|---|
| TAG 1 | | TAG 2<br>TAG 3 | | | | TAG 4 | |
| 100A | 100B | 100C | 100D | 100E | 100F | 100G | 100H |

SYSTEMS AND METHODS FOR Q VALUE DETERMINATION

FIELD OF THE INVENTION

This application relates generally to a radio frequency identification (RFID) tag reader. More specifically, the application relates to calculating a value of Q for a subsequent inventory round.

BACKGROUND OF THE INVENTION

The Gen2 RFID protocol utilizes a Q round methodology to inventory a population of tags. An interrogator chooses a value of Q and sends this number in a query command to a population of tags. Each tag in the population then picks a random number between 0 and $2^Q - 1$. This number represents the slot of the round in which the tag backscatters its message (RN16) value to the interrogator.

Figure 1A:
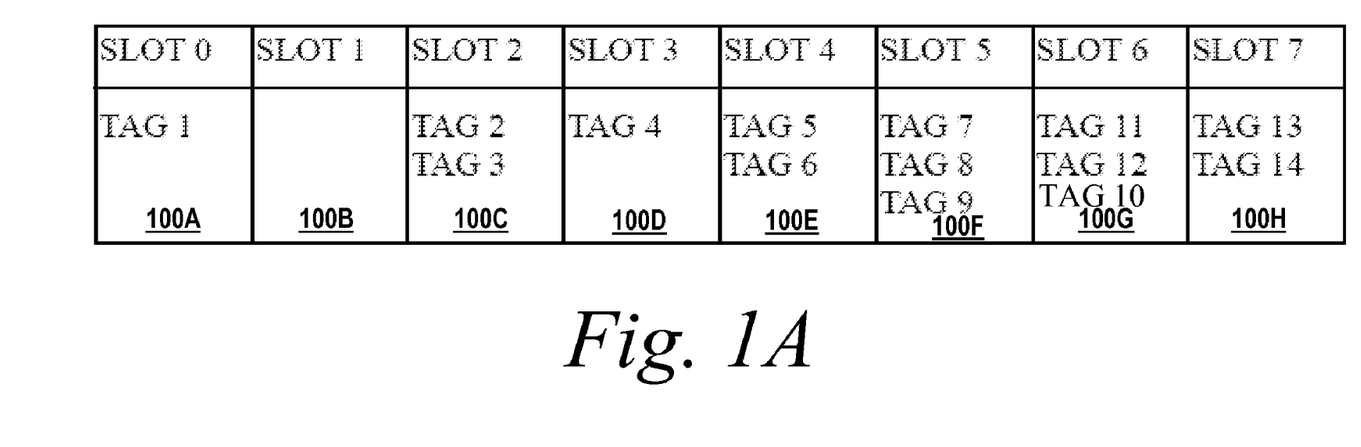
FIG. 1A depicts an embodiment of a block diagram representation of a number of slots for categorization by an RFID tag reader system.

With reference to FIG. 1A, the interrogator chose a Q value of three, thus creating eight possible slots 100A, 100B, 100C, 100D, 100E, 100F, 100G, 100H (referred to generally as slot 100). Fourteen tags were available during this inventory round. Slot zero 100A and slot three 100D are each chosen by only one tag and are therefore referred to as "singly occupied slots". These slots 100 are decoded correctly. None of the tags chose slot 100B, and that slot is therefore referred to as "empty". Two or more tags occupy the remaining slots 100C, 100E, 100F, 100G, 100H causing "collisions" in their respective tag responses. The inventory round depicted in FIG. 1A typically results in successful decoding of two tags. In response, the interrogator increases the value of Q in the next round reducing the number of collisions occurring rendering more tags readable.

Figure 1B:
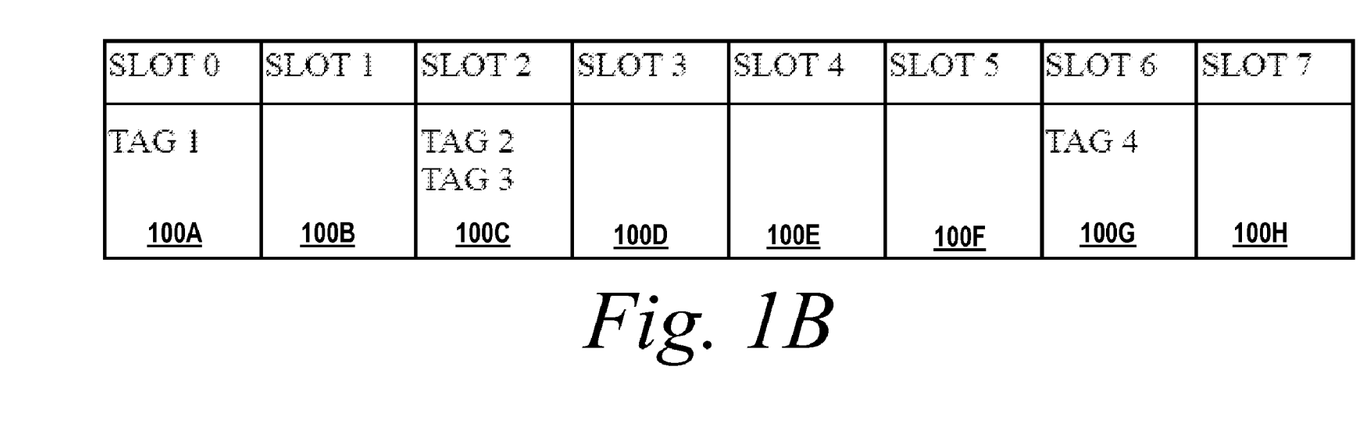
FIG. 1B depicts another embodiment of a block diagram representation of a number of slots for categorization by an RFID tag reader system.

With reference to FIG. 1B, the interrogator uses the same Q value of three but with a population of four tags instead of fourteen. Sensing the large number of "empty" slots the interrogator should reduce the value of Q in the subsequent inventory round, to reduce the time taken to inventory the tags correctly.

Figure 2:
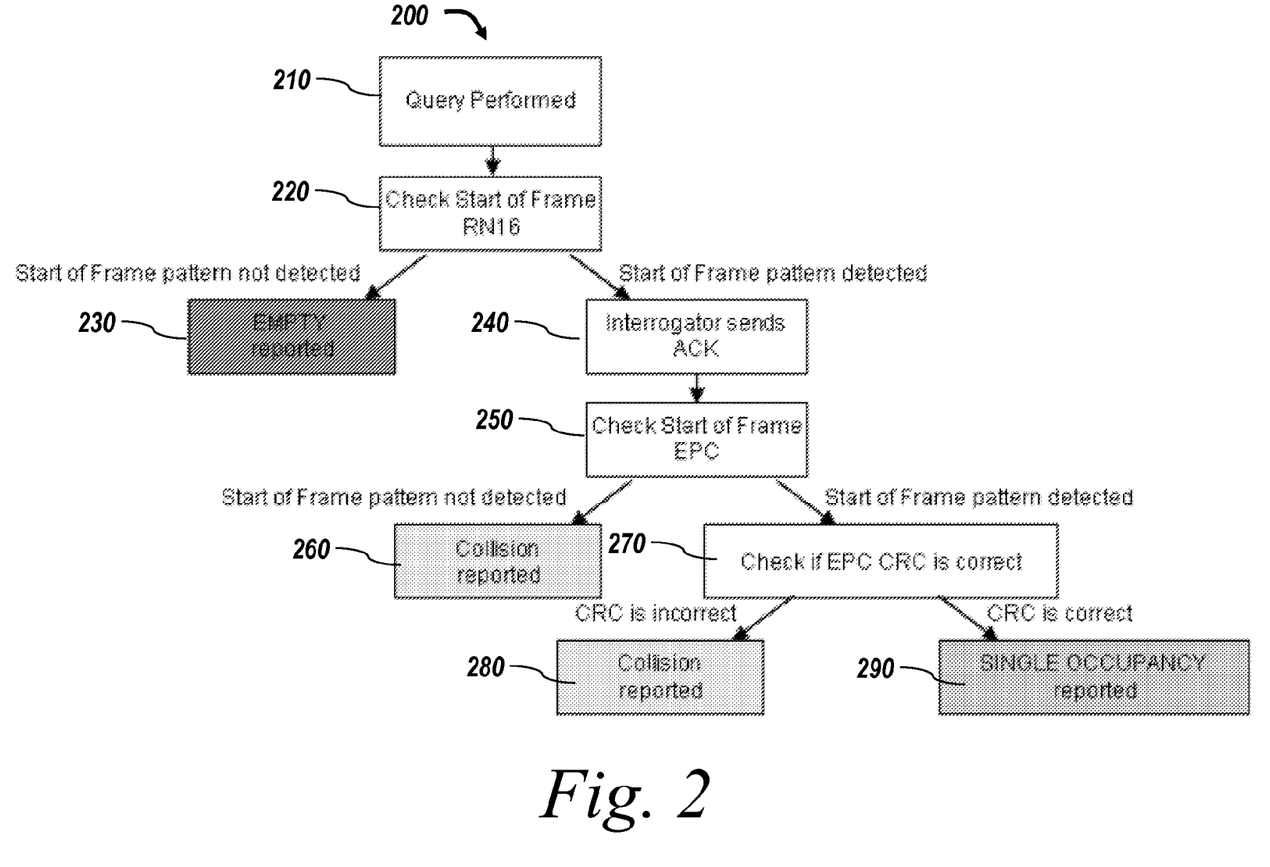
FIG. 2 is depicts a flow chart of an embodiment of a method of classifying slots according the Gen2 RFID protocol.

FIG. 2, shows a typical Gen2 query method 200 for determining whether a slot 100 is singly occupied, empty, or a collision. The method includes performing (step 210) a query and checking (step 220) for the RN16 start-of-frame pattern. If the RN16 start-of-frame pattern is not detected, the slot 100 is classified (step 230) as empty. When the RN16 start-of-frame pattern is detected, the interrogator transmits (step 240) an ACK message. After sending the ACK message, the reader checks (step 250) for the EPC start-of-frame pattern. If the EPC start-of-frame pattern is not detected, the slot 100 is classified (step 260) as collided. When the EPC start-of-frame pattern is detected, the EPC cyclic redundancy check (CRC) is checked (step 270) for correctness. If the CRC is incorrect, the slot 100 is classified (step 280) as collided. The slot 100 is classified (step 290) as singly occupied when the CRC is correct.

As shown, the ability to successfully decode the start-of-frame pattern is critical in classifying the outcome of the slot 100. This start-of-frame pattern can be seen by the phase reversals following the pilot tone as per the Miller or FM0 coding scheme basis functions. Basis functions for the Miller coding scheme are defined in EPC Global Specifications. Miller coding inserts phase reversal in the middle for a '1' bit and a phase reversal for a '0' bit depending on the next bit. Phase reversals can be detected from sign changes in the output of a matched filter. This detection algorithm can tolerate the link frequency variation of up to 50% (most of the standards limit the link frequency variation to <15%). Interrogator estimates the link frequency from the pilot tone with in the first three cycles and continues to track it during the response. This way a matched filter can reliably detect any phase reversals after three cycles.

Noise sources, collisions, interference and bit errors however can cause problems in accurately deciphering the start-of-frame pattern. This may lead to incorrect classification of the outcomes of a slot 100. In addition, bit errors may cause the CRC check to fail. In that case a singly occupied slot 100 may be misinterpreted as a collision.

As can be seen from the above examples, it is important that the interrogator accurately identify the number of empty, single occupied slots, and collisions to adjust the value of Q for the next inventory round. By adjusting the Q value the number of tags read correctly is increased and the time required to read those tags is reduced.

SUMMARY OF THE INVENTION

In one aspect, a modified search algorithm that reduces the likelihood that interference sources and noise can confuse the RFID interrogator is shown and described. This algorithm keeps read rates high with respect to the unmodified search algorithm.

In another aspect, another algorithm can be used to calculate a parameter for use in an inventory round. In some embodiments, the algorithm utilizes the categorization information to adapt quickly and make a quick determination of the parameters for the next inventory round.

In one aspect, the invention features a method for determining a Q value for use by a radio frequency identification (RFID) tag reader in an inventory round. The inventory round classifies each slot of the inventory round as either an empty slot, a collided slot, or singly occupied slot. The method includes determining at least one of: a number of empty slots, a number of collided slots, and a number of singly occupied slots, in response to the completion of an inventory round and applying a function to at least one of: the number of empty slots, the number collided slots, and the number of singly occupied slots, to determine a Q value for another inventory round.

In one embodiment, the method includes applying a logarithm function to at least one of: the number of empty slots, the number of collided slots, and the number of singly occupied slots. In some embodiments, the logarithm function is a base 2 logarithm. In yet another embodiment, the method includes using a series to estimate the logarithm function.

In one embodiment, the method includes applying a base 2 logarithm function to the sum of the number of singly occupied slots and a multiple of the number of collided slots. In some embodiment, the multiple of the number of collided slots is two.

In another aspect, the invention features a system for determining a Q value for use by a radio frequency identification (RFID) tag reader in an inventory round. The system includes a transmitter, a receiver, and a processing unit. The transmitter transmits, to zero or more RFID tags, a message during a slot of an inventory round. The receiver receives a response from at least one of the zero or more RFID tags. The processing unit determines at least one of: a number of empty slots, a number of collided slots, and a number of singly occupied slots, in response to the completion of an inventory round and applies a function to at least one of: the number of empty slots, the number collided slots, and the number of singly occupied slots, to determine a Q value for another inventory round.

In another aspect, the invention features a system for determining a Q value for use by a radio frequency identification (RFID) tag reader in an inventory round. The system includes means for determining at least one of: a number of empty slots, a number of collided slots, and a number of singly occupied slots, in response to the completion of an inventory round and means for applying a function to at least one of: the number of empty slots, the number collided slots, and the number of singly occupied slots, to determine a Q value for another inventory round.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION

Used throughout the specification are terms that are understood by one of ordinary skill in the art to correspond to the definitions taken from EPC Global Radio Frequency Identity Protocols Class-1 Generation-2 UHF RFID Protocol for communication at 860 MHz to 960 MHz Version 1.0.9. Examples of terms include, but are not limited to: RFID, Gen2, UHF, Q, RN16, EPC, CRC, Slot, T1, SNR, LF, Pilot Tone, PC Bits, Empty, Collision, Singly Occupied, Interrogator, ACK, Inventory Round, and False Positives.

Figure 3:
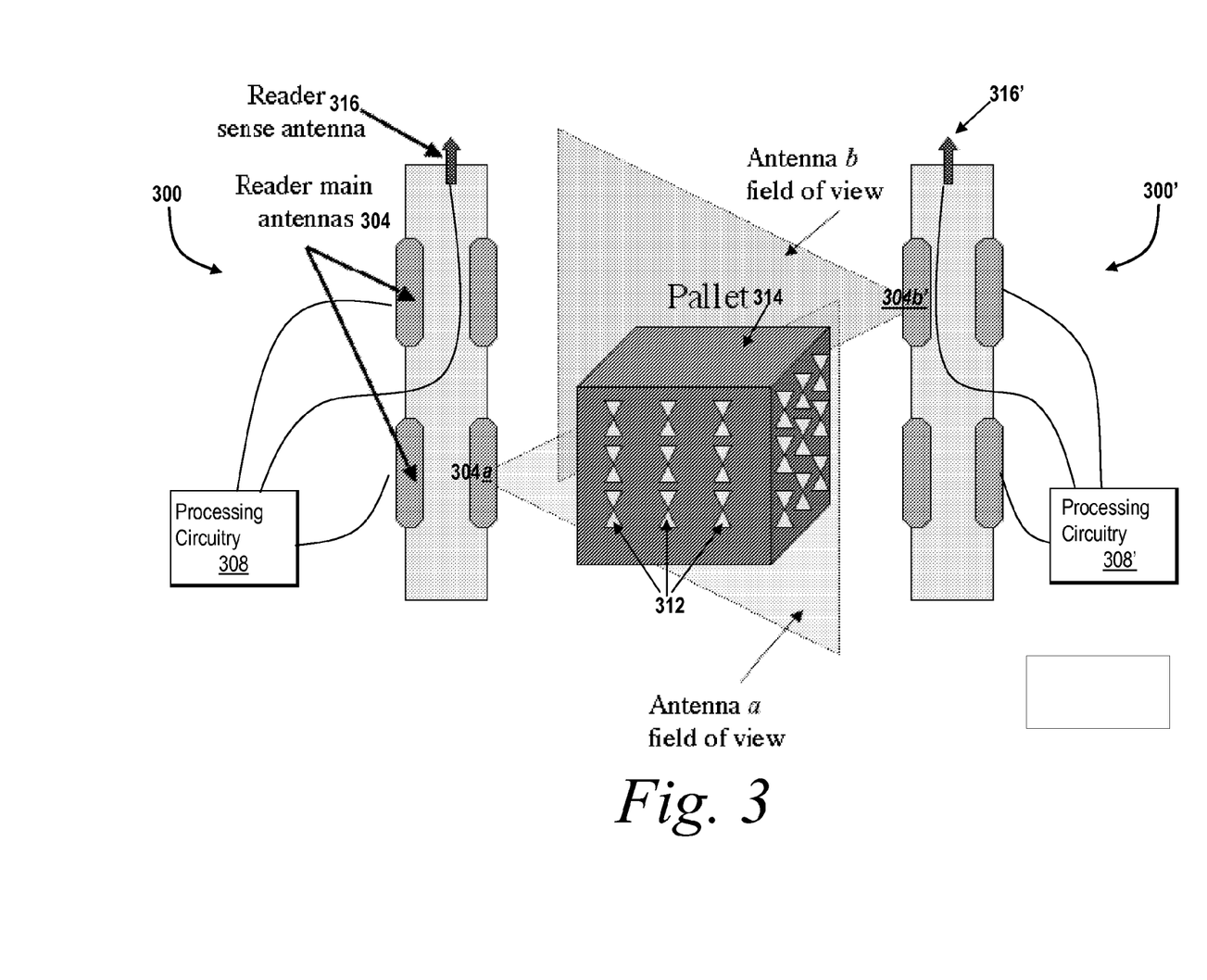
FIG. 3 depicts a block diagram of an embodiment of a RFID tag reader system.

With reference to FIG. 3, one embodiment of an RFID tag reader system 300 includes one or more antenna elements 304 in communication with processing circuitry 308. The antenna elements can be any type of an antenna element. For example, the antenna elements 304 can be, but are not limited to, patch antennas, waveguide slot antennas, dipole antennas, and the like. Each antenna element of the RFID tag reader system 300 can be the same type of elements. Alternatively, the RFID tag reader system 300 incorporates two or more different types of antenna elements 304. In some embodiments, one or more of the antenna elements 304 includes a plurality of antenna elements (i.e., an array of antenna elements). In some embodiments, the antenna elements 304 are multiplexed.

As shown in FIG. 3 in some installations, an additional RFID tag reader system 300' is mounted near a first RFID tag reader system 300. One or more of the antenna elements 304 receives the response signals from RFID tags 312 that are placed on items of a pallet 314 in response to the QUERY command issued from the tag reader system 300. These response signals can also include a noise component that is the result of the RF environment in which the RFID tag reader system 300 operates. The second tag reader system 300' also can transmit a QUERY signal, which can be received by a receiving antenna element 304a. In some cases, the signals transmitted from an antenna element 304b' of the second tag reader system 300', which is located at an adjacent position to the first tag reader system 300 (e.g., an adjacent warehouse loading dock door), are coupled into the receiving antenna 304a of the reader under test 300.

Although shown as receiving noise from another RFID tag reader system 300', it should be understood that the noise and interference can take other forms. For example, fluorescent lights can generate RF noise and interference, as when an incident reader signal is backscattered from the periodically ionized gases in the fluorescent light. Also, the noise and interference can results from the backscattering noise produced by time varying reflection present in the environment. Also, other wireless items operating in the environment of the RFID tag reader system 300 can generate noise, such as legacy wireless LAN equipment, cordless telephones, previous RFID readers, or other industrial, scientific, or medical (ISM) devices.

As shown in FIG. 3, one embodiment of the RFID tag reader system 300 includes an optional sense antenna 316. The sense antenna 316 samples the local RF environment, primarily for the purpose of sampling the transmitted signals sent by "jammers" preferentially to tag response signals. In some embodiments, the sense antenna may perform this preferential reception by means of an antenna radiation pattern that favors reception of the noise source(s) over reception of tag responses. This sampled energy is transferred to a "sense receiver" that is part of the processing circuitry 308 of the RFID tag reader 300. In some embodiments, the processing circuitry 308 uses the sampled noise information extracted from the signals received by the sense antenna 316 to effectively subtract the sampled noise from the signals received by the receiving antenna 304a of the RFID tag reader 300.

In one embodiment, the optional sense antenna 316 is a separate antenna element that is in communication with RFID tag reader system 300. The sense antenna 316 can be collocated within the RFID tag reader system 300. The sense antenna 316 is configured to sample the local RF environment and preferentially receive signals from jammers at a higher signal level than tag response signals. The received signals can include noise and interference signals from the second RFID tag reader system 300' and other interference sources.

The sense antenna 316 can take various forms. For example, the sense antenna 316 may be an omnidirectional monopole antenna. In such an embodiment, the sense antenna 316 is separate from the other antenna elements 304 of the RFID tag reader system 300. In other embodiments, the sense antenna 316 can be, but is not limited to, patch antennas, waveguide slot antennas, dipole antennas, and the like. In essence, any type of antenna can be used as the sense antenna 316. In certain embodiments, the sense antenna element 316 need not be collocated with the reader under test. Said another way, the use of spatial diversity (e.g., antenna position) or polarization diversity can be employed to preferentially couple more noise and interference into the sense antenna 316 than tag response signal. In other embodiments, the sense antenna's radiation pattern can be configured to favor reception of noise and interference preferentially over tag responses. In addition, beam steering techniques, in the case where the sense antenna 316 is an array or a mechanically steered antenna, can be used to preferentially receive the noise and interference signal from the second RFID tag reader system 300'.

In another embodiment, the sense antenna 316 is one of the antenna elements 304 of the RFID tag reader system 300 that is not in use for the tag response signal reception task. The processing circuitry 308 can include circuitry and/or software that provides the ability to switch among the antenna elements 304 which antenna element 304 is dedicated to receiving (i.e., the sense antenna 316) the noise signals from the second RFID tag reader system 300'. Said another way, in one embodiment the sense antenna 316 can be switchably connected to either dedicated noise reception circuitry or tag response reception circuitry. This can take the form of an antenna element 304 that is not selected by the reader's processing circuitry 308 but is instead selected for connection to the noise cancellation circuitry.

In operation, in order to read the RFID tags 312, a QUERY command is transmitted from the reader system 300 toward the pallet of items having the RFID tags 312. Each RFID tag 312 in the population then picks a random number between 0 and $2^Q-1$. This number represents the slot 100 of the round in which each of the RFID tag 312 responds to the tag reader 300. The reader system 300 receives the responses and communicates them to the processing circuitry 308. The processing circuitry 308 of the RFID tag reader 300 processes the received signals to classify each slot 100 of the inventory round. Also, the processing circuitry can determine the Q value to use for the next inventory round.

Figure 4:
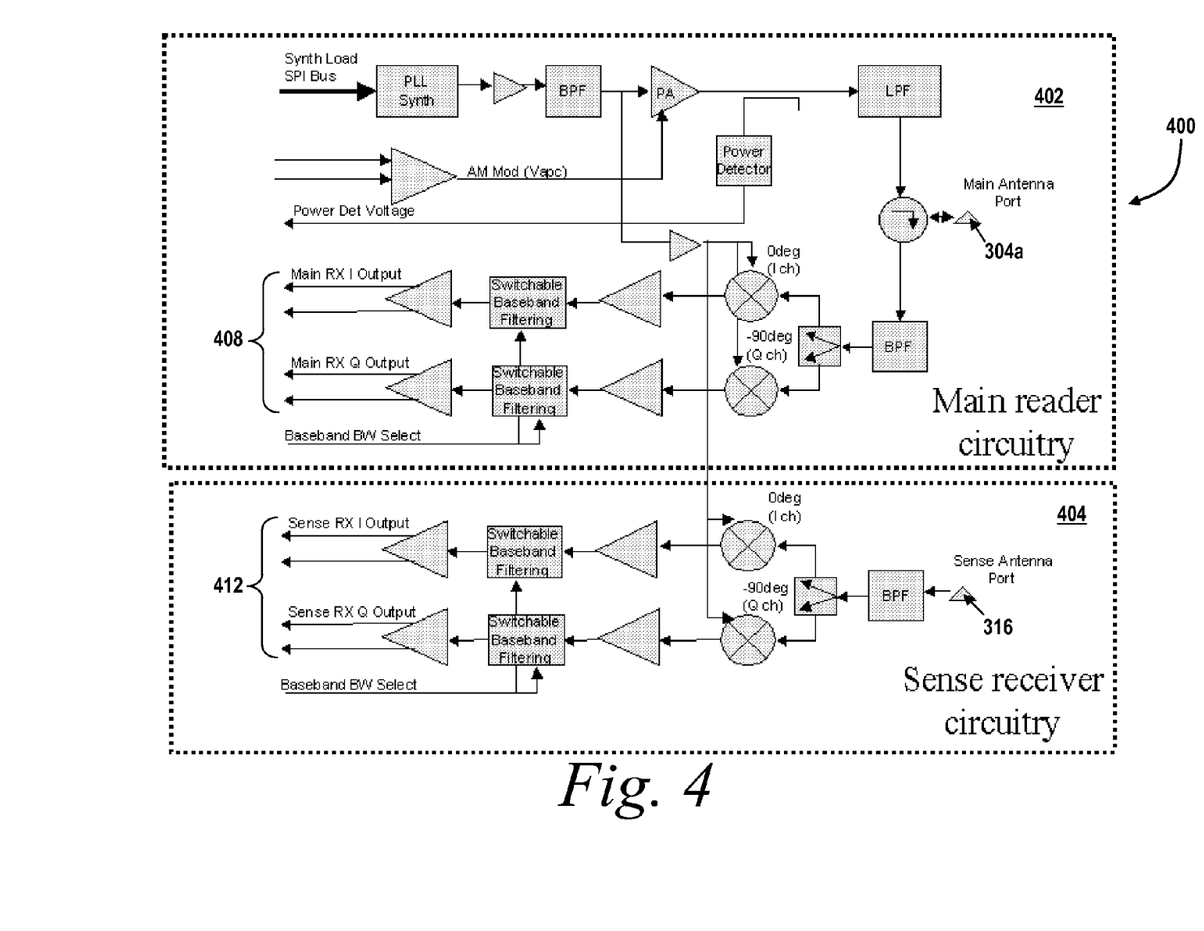
FIG. 4 depicts a block diagram of an embodiment of a RFID tag reader analog circuitry.

With reference to FIG. 4, one embodiment of the analog portion 400 of the processing circuitry 308 includes main reader (also referred to as main receiver through the specification) circuitry 402 and optional sense receiver circuitry 404. As shown in FIG. 4, the main reader circuitry 402 includes various components such as an in-phase demodulator, a quadrature demodulator, one or more filters, and one or more amplifiers. One or more of the various components of the main reader circuitry 402 may communicate with the sense reader circuitry 404.

In one embodiment, the sense receiver circuitry 404 includes at least some duplicate components of the main reader circuitry 402. For example, the sense receiver circuitry 404 includes duplicates of the in-phase demodulator, the quadrature demodulator, the one or more filters, and the one or more amplifiers. In a specific embodiment, the sense receiver circuitry 404 is an additional quadrature demodulator that is a replica of the main reader circuitry 402.

In one embodiment, the sense receiver circuitry 404 is driven from the same local oscillator as the main receiver circuitry 400. As such, the sense receiver circuitry 404 is tuned to the same frequency as the main reader circuitry 402. In another embodiment, the sense receiver circuitry 404 is driven from a separate local oscillator (not shown).

In operation, the optional sense antenna 316 and the sense receiver circuitry 404 cooperate to sample the local RF environment in which the RFID tag reader system 300 operates. The main reader circuitry 402 generates one or more received analog response signals 408 (e.g., in-phase and quadrature signals). These signals are also referred to as response signals 408 throughout the specification. Portions of the response signals can be used to classify each slot 100 of the inventory round. In addition, the sense receiver circuitry 404 optionally generates one or more received analog interference signals 412 (e.g., in-phase and quadrature signals). These signals are also referred to as noise and interference signals.

Further, the sense receiver circuitry 404 cooperates with a digital circuit 500 described below in connection with FIG. 5 to convert a desired bandwidth, which preferably includes the bandwidth of the tag responses, to a digitized baseband signal for further processing. For example, the digitized main reader circuitry signal to categorize each slot 100 of the inventory and, in some embodiments, generate a Q value for the next inventory round.

Figure 5:
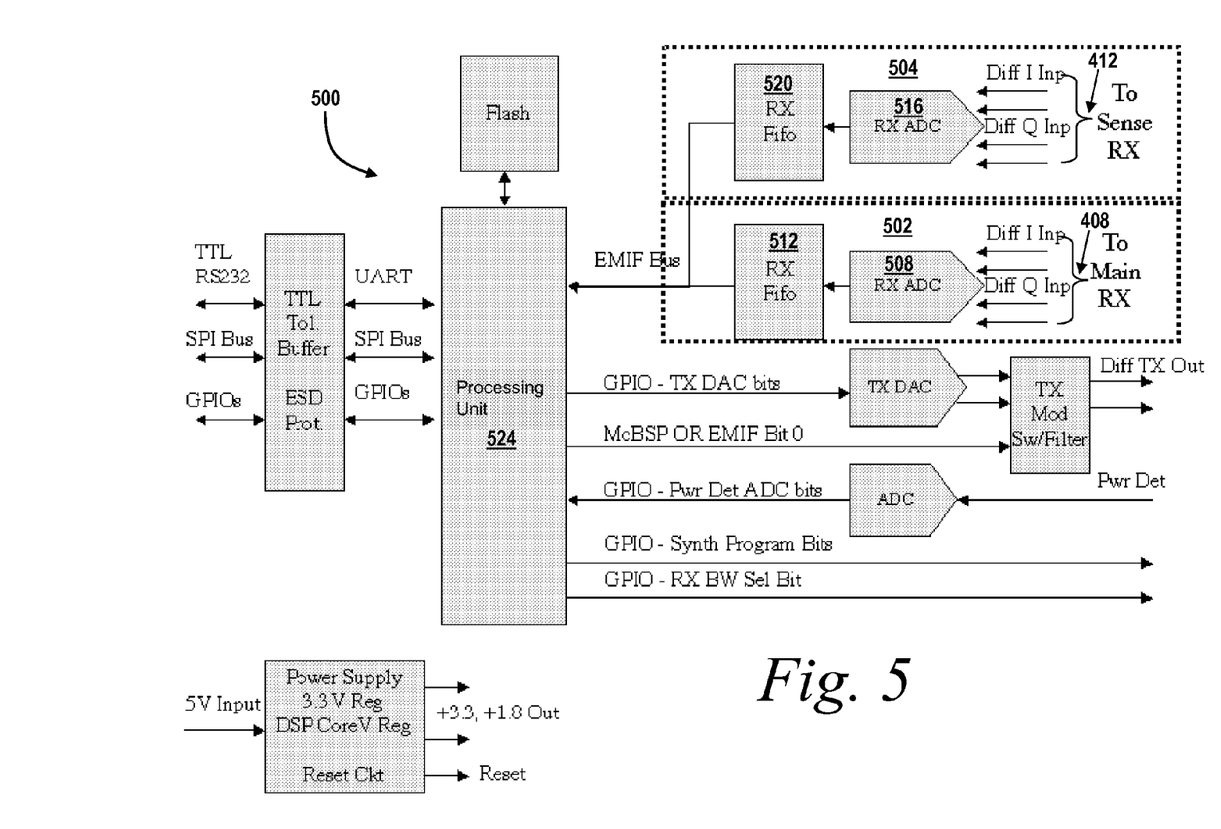
FIG. 5 depicts a block diagram of an embodiment of a RFID tag reader digital circuitry.

With reference to FIG. 5, one embodiment of the digital portion 500 of the processing circuitry 308 is shown and described. The digital portion 500 includes a main digital receiver section 502 and an optional sense digital receiver section 504. In one embodiment, the main digital receiver section 502 includes an analog to digital converter 508 (RX ADC) in communication with to the main reader circuitry 402 of FIG. 4 that receives the analog response signals 408 from the main reader circuitry 402. The RX ADC 508 also communicates with a first-in-first-out (RX FIFO) memory 512. Although shown as having a single ADC 508, other embodiments can include additional RX ADCs 508 can be used. For example, each of the in-phase signal and quadrature signals can be fed into a respective ADC 508. Also, additional FIFO memories 512 can be used to store each of the respective digitized signals.

The sense digital receiver section 504 includes an analog to digital converter 516 (RX ADC) that communicates with the main reader circuitry 404 of FIG. 4 to receive the analog noise and interference signals 412 from the main reader circuitry 404. The RX ADC 516 communicates with a first-in-first-out (FIFO) memory 520. In other embodiments, the RX ADC 516 communicates with an FPGA (not shown). Although shown as having a single RX ADC 508, it should be understood that additional RX ADCs 508 can be used. For example, each of the in-phase signal and quadrature signals can be fed into a respective RX ADC 508. Also, additional FIFO memories 320 can be used to store each of the respective digitized signals.

In operation in the responses to the QUERY command, the reader antenna signals 408 are received and digitized, the digitized signals are communicated to processing unit 524 (e.g., a digital signal processor (DSP)). In some embodiments, the processing unit 524 periodically accesses the FIFO memories, retrieves the digitized signals, and processes the digital signals. The processing unit 524 performs additional processing on the digitized response signal to classify each slot 100 of the inventory round accordingly.

In one embodiment, the processing unit 524 is a DSP. In another embodiment, the processing unit 524 is a field programmable gate array (FPGA). In another embodiment, one or more application specific integrated circuits (ASIC) are used. Also, various microprocessors can be used in some embodiments. In other embodiments, multiple DSPs are used along or in combination with various numbers of FPGAs. Similarly, multiple FPGAs can be used. In one specific embodiment, the processing unit 524 is a BLACKFIN DSP processor manufactured by Analog Devices, Inc. of Norwood, Mass. In another embodiment, the processing unit 524 is a TI c5502 processor manufactured by Texas Instruments Inc. of Dallas Tex.

Figure 6:
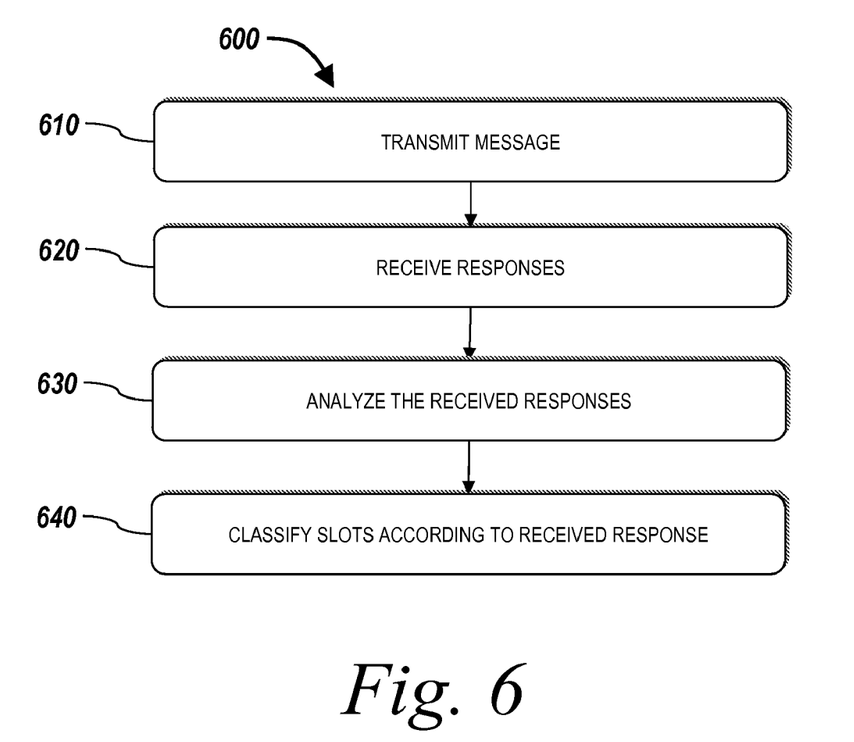
FIG. 6 depicts a flow chart of an embodiment of a method of a transaction for a slot of an inventory round.

With reference to FIG. 6, a method 600 of classifying a slot of an inventory round. The method 600 includes transmitting (step 610) a message to zero or more RFID tags 312, receiving (step 620) a response from at least some of the RFID tags 312, analyzing (step 630) the received responses, and classifying (step 640) the slots in response to the analysis.

Still referring to FIG. 6 and in greater details, in one embodiment the DSP 524 signals the other components of the reader system 300 to issue a query command. In some embodiments, a query command is issued during each slot of the inventory round for a present Q value. In other embodiments, a single query command is issued from the reader system 300.

One or more of the antennas 304 receive (step 620) a response from one or more of the RFID tags 312. In other embodiments, the sense antenna 316 receives the responses. In still other embodiments, various combinations of the antenna 304 and the sense antenna 316 receive the responses.

The received responses are communicated through the analog section 400 and digital section 500 of the reader system 300. The analog section 400 and digital section 500 prepare the responses from processing by the DSP 524. In one embodiment, the DSP 524 analyzes the receive responses to detect whether a phase reversal is present in the received response signal pilot tone. Depending on this determination further processing may or may not be required. For example, if a phase reversal is found within a specified time period of the response signal the slot is classified (step 640) as an empty slot. If the DSP 524 does not detect a phase reversal, the received response is classified as either collided or singly occupied depending on further processing and analysis performed by the DSP 524. In one embodiment, the DSP detects a phase reversal within the modulation coding. In other embodiments, the physical layer of a baseband signal (e.g., in-phase "I" or quadrature "Q") is inspected for a phase reversal.

In one embodiment, the DSP 524 or other components of the reader system 300 perform pattern matching on the received response signal. In one embodiment, a collision classification is applied to the slot when the patterns do not match. If there is pattern match, the DSP 524, in one embodiment, instructs some of the other components of the reader system 300 to issue an acknowledgment (e.g., ACK). As used herein, pattern matching refers to checking for the presence of the constituents of a given pattern. Pattern matching can be used, in some embodiments, to check that an signal has the desired structure, to find relevant structure, to retrieve the aligning parts, and to substitute the matching part with something else.

The reader system 300 receives a response to the acknowledgment messages and performs analysis thereon. In one embodiment, the DSP 524 performs analysis thereon (e.g., detecting phase reversals). In one embodiment, the DSP 524 performs pattern matching on the received response to the acknowledgment message. Pattern matching can include, but is not limited to, any filtering, linear transformation or hypothesis test. If there is not a pattern match, the slot is classified (step 640) as collided. If there is a pattern match, the DSP 524 performs further processing and analysis on the received response signal to the acknowledgment message.

In one embodiment, the further processing and analysis includes decoding at least a portion of the response to the acknowledgment message. In other embodiments, the further processing and analysis includes detecting phase reversals. The decoded portion of the response to the acknowledgment message is compared to an expected result. For example, a CRC calculation can be used. If the decoded portion does not match the expected result, the slot is classified as collided. If the expected result matches the decoded portion, the slot is classified as singly occupied.

In one embodiment, if a length specified by a decoded response length indicator does not match the length of the decoded message the slot is classified as collided. However, if the decoded response length indicator does match the length of the decoded message the slot is classified as singly occupied.

Figure 7:
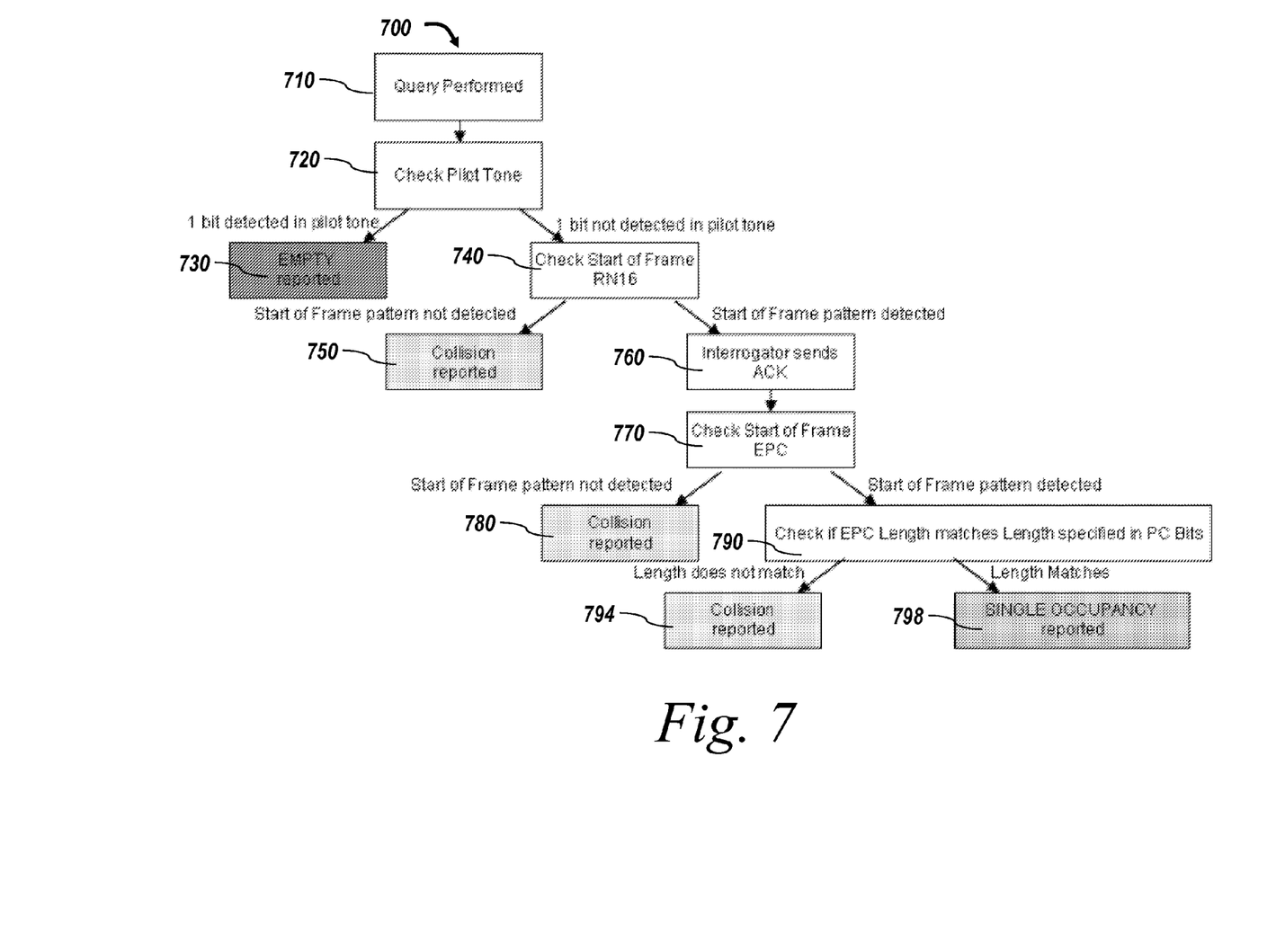
FIG. 7 depicts a flow chart of an embodiment of a method of classifying the outcome of a slot of an inventory round.

With reference to FIG. 7, a block diagram of similar construction to that of FIG. 2 highlights the differences in an embodiment of a method of classifying slots of an inventory round according to above-described principles when compared to the method shown in FIG. 2. The method 800 includes performing (step 710) a query and checking (step 720) for a pilot tone. If the pilot is not detected the slot is classified (step 730) as empty. However, if the pilot tone is detect, the method 800 checks (step 740) for the RN16 start-of-frame pattern. If the RN16 start-of-frame pattern is not detected, the slot 100 is classified (step 750) as collided. When the RN16 start-of-frame pattern is detected, the interrogator transmits (step 760) an ACK message. After sending the ACK message, the reader checks (step 770) for the EPC start-of-frame pattern. If the EPC start-of-frame pattern is not detected, the slot 100 is classified (step 780) as collided. When the EPC start-of-frame pattern is detected, the EPC length is checked (step 790). If the length does not match the length specified in the EPC message length indicator, the slot is classified (step 794) as collided. However, if the length does match the slot is classified (step 798) as singly occupied.

Figure 8:
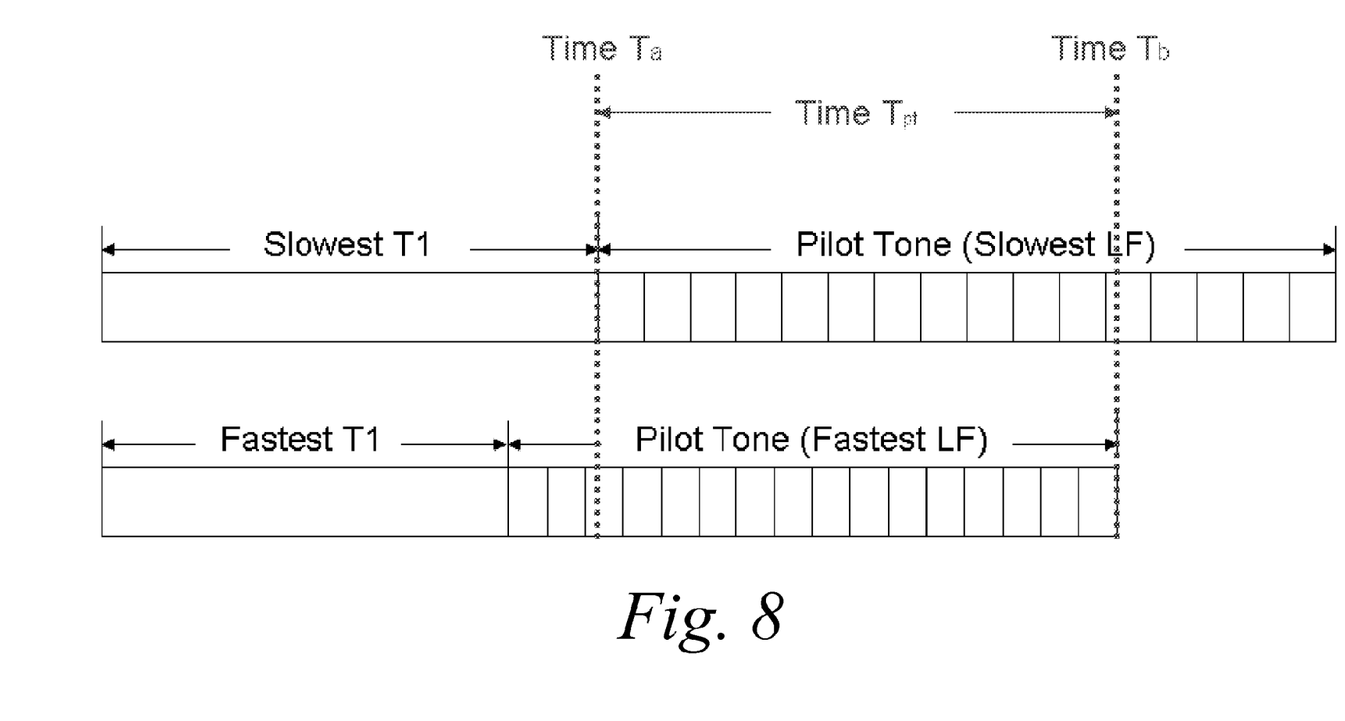
FIG. 8 depicts an embodiment of a method for determining a time period to check for phase reversals.

With reference to FIG. 8 and by way of example, having a known range of link frequencies and a known range of T1 times, it is possible to calculate the fastest possible time ($T_b$) for the first bit of the start-of-frame pattern received by the interrogator. Time $T_b$, in one embodiment, is calculated by adding the fastest allowed T1 value to the pilot tone of a known number of cycles at the highest allowed link frequency. The slowest allowed T1 time is shown as time $T_a$. The difference between $T_b$ and $T_a$ is $T_{pt}$. During this time period (i.e., $T_{pt}$) for a singly occupied slot only a pilot tone will be present, if the principles described above are applied. In the case of a collided slot, multiple pilot tones will be superimposed in this region; however, from the principle of superposition, the resulting waveform will comprise basis functions of the pilot tone and therefore lack phase reversals.

By way of example and with continued reference to FIG. 8, assume operations occur at using a 240 kHz nominal link frequency and a Miller coding response. Based on the EPC Global Gen2 specification, an RFID tag 312 backscatters at a link frequency between 206 KhZ and 276 kHz. For example in the case of a 240 kHz nominal Link Frequency and a Miller coding response. The tag 312 sends a response with a T1 time of between 57 us and 77 us. In this case Time $T_a$ is 57 us and Time $T_b$ is 115 us. For a period of ($T_{pt}=T_b-T_a$) in time, link frequency is estimated and tracked using a matched filter output for phase reversals. For this duration, both collided tag responses and singly occupied slots will contain a pilot tone or multiple pilot tones that are superimposed and the matched filter will not detect any phase reversals. However, if there is phase reversal detection it will be considered as empty slot.

Having separated empty slots from collided slots, further separation of singly occupied slots from collisions can occur at two additional points during the message transaction. If no phase reversals are detected within the $T_{pt}$ window but the start-of-frame pattern does not match the predetermined pattern the DSP can determine that a collision occurred. If the start-of-frame pattern does indeed match, the interrogator sends an ACK command to the tag 312. If the ACK was sent correctly a single tag will send a response that can be checked for its start-of-frame pattern. If this does not match, the ACK was sent incorrectly indicating a collision occurred.

If the start-of-frame does match the required pattern the decoder begins to process the EPC. If the decoded EPC message length matches that determined by the PC bits sent along with the EPC a singly occupied slot is reported, otherwise a collision is reported. These features aid in alleviating any problems that may arise from bit errors in a low signal-to-noise environment.

Figure 9:
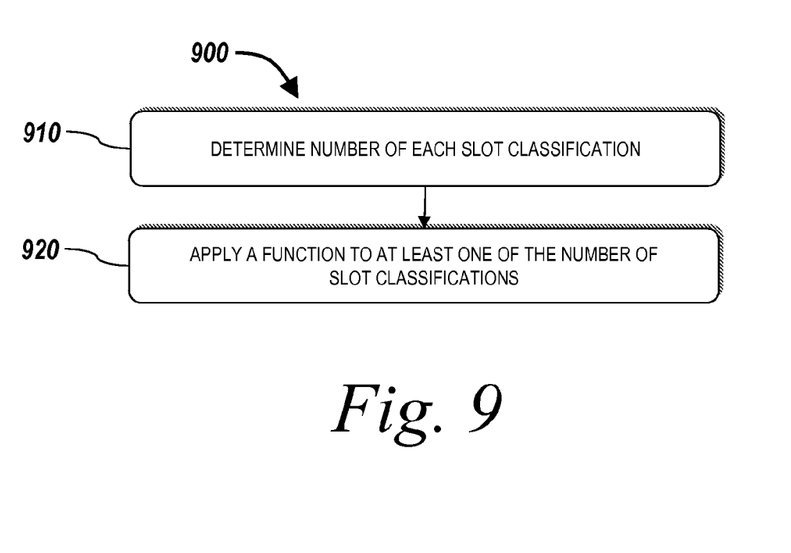
FIG. 9 depicts a flow chart of an embodiment of a method of generating a Q value for use in an inventory round.

Once the slots are classified, the number of each type of slot can be used, alone or in various combinations to generate a new Q value for use by the reader system 300 in the next inventory round. With reference to FIG. 9, an embodiment of a method 900 of determining a Q value for use by an RFID reader system 300 in an inventory round is shown and described. The method 900 includes determining (step 910) at least one of the number of empty slots, the number of collided slots, and the number of singly occupied slots in an inventory round and applying (step 920) a function to at least one of the determined number of empty slots, the number of collided slots, and the number of singly occupied slots to determine a Q value for another inventory round.

In one embodiment, the number of each category of slots, that is empty, collided, and singly occupied, is determined (step 910) using the above-described techniques. In other embodiments, other methods are used to determine the number of each type of slot classification.

In one embodiment, the DSP 524 calculates a Q value by applying (step 920) a logarithm function to at least one of the number of number of empty slots, the number of collided slots, and the number of singly occupied slots. In a further embodiment, a base-two logarithm function is applied. In another embodiment, a base-two logarithm function is applied to the sum of the singly occupied slots and twice the number of collided slots. In other embodiments, a different multiple of the number of collided slots is summed with the number of singly occupied slots. In some embodiments, a series estimation is used instead of a logarithm function.

Experimental Data:

The above-described principles were applied in a number of different experimental situations. The performance of these principles were recorded and reported below.

Experiment 1: In a field with no tags, a dense reader mode (DRM) compliant interference source was applied at five frequencies (four channels away to co-channel). At each of these relative frequencies to the device under test (DUT) frequency the amplitude of the interferer was varied from +12 dBm (decibel referred to one milliwatt) to −50 dBm in 2 dB steps. At each of these conditions the number of collisions and empty slots seen was measured for one thousand iterations. The performance is reported below in Table 1.

TABLE 1

|  | Correctly Report as Empty % | False Positive % |
|---|---|---|
| Maximum | 100.00% | 0.20% |
| Minimum | 97.80% | 0.00% |
| Average | 99.64% | 0.03% |
| Standard Deviation | 0.38% | 0.05% |

Experiment 2: With a DRM compliant interference source placed at 915.25 MHz the DUT frequency was swept across fifty frequencies from 902.75 MHz to 927.25 MHz in 500 kHz steps. The amplitude of the interferer was varied from +12 dBm to −50 dBm in 2 dB steps. At each of these conditions the number of collisions and empty slots seen was measured for one hundred iterations. The performance is reported below in Table 2.

TABLE 2

|  | Correctly Report as Empty % | False Positive % |
|---|---|---|
| Maximum | 99.82% | 0.08% |
| Minimum | 97.48% | 0.00% |
| Average | 99.19% | 0.02% |
| Standard Deviation | 0.68% | 0.03% |

Experiment 3: With the transmit port connected through a variable attenuator directly into the receive port of the reader, the attenuation of the variable attenuator was stepped from 4 dB to 60 dB in 2 dB steps. At each of these conditions the number of collisions and empty slots seen was measured for one thousand iterations. The performance is reported below in Table 3.

TABLE 3

|  | Correctly Report as Empty % | False Positive % |
|---|---|---|
| Maximum | 100.00% | 0.14% |
| Minimum | 98.24% | 0.00% |
| Average | 99.49% | 0.04% |
| Standard Deviation | 0.44% | 0.04% |

Note: It is desirable to keep the false positive number to as few as possible. False positives indicate cases where the noise passed both the pilot tone test and the SOF detection. An ACK statement is unnecessarily sent in these cases costing time.

Experiment 4: Collisions were forced in populations of tags ranging from two tags to twenty tags. At each of these conditions the number of collisions and empty slots seen was measured for one thousand iterations. The performance is reported below in Table 4.

TABLE 4

|  | Incorrectly Reported as Empty % |
|---|---|
| Maximum | 0.00% |
| Minimum | 0.00% |
| Average | 0.00% |
| Standard Deviation | 0.00% |

Experiment 5: A population of two hundred tags were placed in a field. The position of these tags relative to the interrogator antenna was changed in ten steps. At each of these conditions the number of collisions and empty slots seen was measured for one thousand iterations. The performance is reported below in Table 5.

TABLE 5

|  | Incorrectly Reported as Empty % |
|---|---|
| Maximum | 0.00% |
| Minimum | 0.00% |
| Average | 0.00% |
| Standard Deviation | 0.00% |

Experiment 6: Two tags were placed in a field. The position of the tags was such that the amplitudes of the tag responses would be almost identical minimizing the number of possible successful decodes. With a DRM compliant interference source placed at 915.25 MHz the DUT frequency was swept across fifty frequencies from 902.75 MHz to 927.25 MHz in 500 kHz steps. The amplitude of the interferer was varied from +12 dBm to −50 dBm in 2 dB steps. At each of these conditions the number of collisions and empty slots seen was measured for one hundred iterations. The performance is reported below in Table 6.

TABLE 6

|  | Incorrectly Reported as Empty % |
| --- | --- |
| Maximum | 0.00% |
| Minimum | 0.00% |
| Average | 0.00% |
| Standard Deviation | 0.00% |

While the invention has been disclosed in connection with the preferred embodiments shown and described in detail, various modifications and improvements thereon will become readily apparent to those skilled in the art. For example, although the above has been described with respect to the UHF RFID Gen2 protocol, the teaching herein can be applied to any RFID protocols that utilize a pilot tone (any continuous wave square or sinusoidal with a single basis function) of known duration (or number of cycles) as part of the message preamble and have tag response timing and link frequency limits.

Accordingly, the spirit and scope of the present invention is to be limited only by the following claims.

What is claimed is:

1. A method of determining a Q value for use by a radio frequency identification (RFID) tag reader in an inventory round, the inventory round classifying each slot of the inventory round as either an empty slot, a collided slot, or singly occupied slot, the method comprising:
    (a) determining, by a RFID tag reader, at least one of: a number of empty slots, a number of collided slots, and a number of singly occupied slots, in response to the completion of an inventory round; and
    (b) applying, by the RFID tag reader, a function to at least one of: the number of empty slots, the number of collided slots, and the number of singly occupied slots, to determine a Q value for another inventory round, wherein applying the function comprises applying a base 2 logarithm function to the sum of (i) the number of singly occupied slots multiplied by a first value and (ii) the number of collided slots multiplied by a second value greater than one.

2. The method of claim 1 wherein the sum further comprises a the number of empty slots multiplied by a third value.

3. The method of claim 2, further comprising transmitting a message to zero or more RFID tags during each slot of the inventory round and analyzing a response from at least one of the one or more RFID tags for the presence of a pilot tone.

4. The method of claim 3, wherein analyzing the response comprises detecting a phase change in the response.

5. The method of claim 4 wherein the second value is two.

6. The method of claim 4 wherein the first value is one.

7. The method of claim 1 wherein applying a function comprises using a series to estimate a logarithm of at least one of: the number of empty slots, the number collided slots, and the number of singly occupied slots.

8. A system for determining a Q value for use by a radio frequency identification (RFID) tag reader in an inventory round, the inventory round classifying each slot of the inventory round as either an empty slot, a collided slot, or singly occupied slot, the system comprising:
    a transmitter that transmits, to zero or more RFID tags, a message during a slot of an inventory round;
    a receiver that receives a response from at least one of the zero or more RFID tags; and
    a processing unit that determines at least one of: a number of empty slots, a number of collided slots, and a number of singly occupied slots, in response to the completion of an inventory round and applies a function to at least one of: the number of empty slots, the number collided slots, and the number of singly occupied slots, to determine a Q value for another inventory round, wherein applying the function comprises applying a base 2 logarithm function to the sum of (i) the number of singly occupied slots multiplied by a first value and (ii) the number of collided slots multiplied by a second value greater than one.

9. The system of claim 8 wherein the processing unit comprises a digital signal processor.

10. The system of claim 8 wherein the processing unit comprises a field programmable gate array.

11. The system of claim 8 wherein the processing unit comprises an application specific integrated circuit.

12. The system of claim 8 wherein the processing unit comprises a microprocessor.

13. The system of claim 8 wherein the sum further comprises the number of empty slots multiplied by a third value.

14. The system of claim 13 wherein the receiver further analyzes the response for the presence of a pilot tone.

15. The system of claim 8 wherein the receiver further detects a phase change in the response.

16. The system of claim 15 wherein the second value is two.

17. The system of claim 15 wherein the first value is one.

18. The method of claim 8 wherein the processing unit uses a series to estimate a logarithm of at least one of: the number of empty slots, the number collided slots, and the number of singly occupied slots.

19. A system for determining a Q value for use by a radio frequency identification (RFID) tag reader in an inventory round, the inventory round classifying each slot of the inventory round as either an empty slot, a collided slot, or singly occupied slot, the system comprising:
    means for determining at least one of: a number of empty slots, a number of collided slots, and a number of singly occupied slots, in response to the completion of an inventory round; and
    means for applying a function to at least one of: the number of empty slots, the number collided slots, and the number of singly occupied slots, to determine a Q value for another inventory round, wherein applying the function comprises applying a base 2 logarithm function to the sum of (i) the number of singly occupied slots multiplied by a first value and (ii) the number of collided slots multiplied by a second value greater than one.

20. The system of claim 19 wherein the sum further comprises a the number of empty slots multiplied by a third value.

21. The system of claim 20, further comprising means for transmitting a message to zero or more RFID tags during each slot of the inventory round and analyzing a response from at least one of the one or more RFID tags for the presence of a pilot tone.

22. The system of claim 21, further comprising means for detecting a phase change in the response.

23. The system of claim 22 wherein the second value is two.

24. The system of claim 22 wherein the multiple of the first value is one.

25. The system of claim 19 wherein the means for applying a function comprises means for using a series to estimate a logarithm of at least one of: the number of empty slots, the number collided slots, and the number of singly occupied slots.

* * * * *